(12) United States Patent
Ijzerman et al.

(10) Patent No.: US 7,986,374 B2
(45) Date of Patent: Jul. 26, 2011

(54) AUTOSTEREOSCOPIC DISPLAY DEVICE USING CONTROLLABLE LIQUID CRYSTAL LENS ARRAY FOR 3D/2D MODE SWITCHING

(75) Inventors: Willem Lubertus Ijzerman, Eindhoven (NL); Siebe Tjerk De Zwart, Eindhoven (NL); Maarten Sluijter, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 184 days.

(21) Appl. No.: 12/281,001

(22) PCT Filed: Feb. 26, 2007

(86) PCT No.: PCT/IB2007/050601
§ 371 (c)(1),
(2), (4) Date: Aug. 28, 2008

(87) PCT Pub. No.: WO2007/099488
PCT Pub. Date: Sep. 7, 2007

(65) Prior Publication Data
US 2009/0033812 A1 Feb. 5, 2009

(30) Foreign Application Priority Data

Mar. 3, 2006 (EP) .................................... 06110655
Nov. 13, 2006 (EP) .................................... 06123918

(51) Int. Cl.
*G02F 1/133* (2006.01)
*G02F 1/1343* (2006.01)
*G02B 6/26* (2006.01)

(52) U.S. Cl. .............................. 349/15; 349/122; 385/16

(58) Field of Classification Search .................. 349/15, 349/122; 359/455, 462, 463; 345/6, 7, 9, 345/32, 43, 103, 109; 385/11, 16
See application file for complete search history.

(56) References Cited

U.S. PATENT DOCUMENTS

| | | | |
|---|---|---|---|
| 6,069,650 A * | 5/2000 | Battersby | 348/59 |
| 6,137,456 A * | 10/2000 | Bhagavatula et al. | 345/7 |
| 6,831,787 B1 | 12/2004 | Scarbrough et al. | |
| 2004/0240777 A1* | 12/2004 | Woodgate et al. | 385/16 |
| 2006/0043980 A1 | 3/2006 | Verstegen et al. | |
| 2006/0098285 A1* | 5/2006 | Woodgate et al. | 359/495 |
| 2007/0008617 A1* | 1/2007 | Shestak et al. | 359/455 |
| 2007/0035672 A1* | 2/2007 | Shestak et al. | 349/15 |
| 2008/0259233 A1* | 10/2008 | Krijn et al. | 349/15 |
| 2008/0266387 A1* | 10/2008 | Krijn et al. | 348/51 |

FOREIGN PATENT DOCUMENTS

| | | |
|---|---|---|
| GB | 2398130 A | 8/2004 |
| GB | 2403815 A | 1/2005 |
| JP | 09203980 A | 8/1997 |
| WO | 9821620 A1 | 5/1998 |
| WO | 03015424 A2 | 2/2003 |
| WO | 2004070451 A1 | 8/2004 |
| WO | 2004070467 A2 | 8/2004 |
| WO | 2004090024 A1 | 10/2004 |

\* cited by examiner

*Primary Examiner* — Akm E Ullah
(74) *Attorney, Agent, or Firm* — Larry Liberchuk

(57) ABSTRACT

An autostereoscopic display device has an array (9) of lenticular elements (11) overlying a display panel (3), the lenticular elements comprising electro-optic material (23) and being switchable to enable 2D and 3D viewing modes. The electro-optic material, for example liquid crystal material, is contained adjacent an optically transparent layer in the form of a lenticular body (21). A birefringent material is utilized for the lenticular body, preferably with the ordinary and extraordinary index of refraction substantially matching that of the electro-optic material.

12 Claims, 3 Drawing Sheets

AUTOSTEREOSCOPIC DISPLAY DEVICE USING CONTROLLABLE LIQUID CRYSTAL LENS ARRAY FOR 3D/2D MODE SWITCHING

FIELD OF THE INVENTION

This invention relates to an autostereoscopic display device of the type that comprises a display panel having an array of display pixels for producing a display and lenticular means, arranged over the display panel and through which the display pixels are viewed.

BACKGROUND OF THE INVENTION

A known autostereoscopic display device comprises a two-dimensional liquid crystal display panel having a row and column array of display pixels acting as a spatial light modulator to produce the display. An array of elongate lenticular elements extending parallel to one another overlies the display pixel array, and the display pixels are observed through these lenticular elements. The lenticular elements are provided as a sheet of elements, each of which comprises an elongate semi-cylindrical lens element. The lenticular elements extend in the column direction of the display panel, with each lenticular element overlying a respective group of two or more adjacent columns of display pixels.

In an arrangement in which, for example, each lenticular element is associated with two columns of display pixels, the display pixels in each column provide a vertical slice of a respective two-dimensional sub-image. The lenticular sheet directs these two slices and corresponding slices from the display pixel columns associated with the other lenticular elements, to the left and right eyes of a user positioned in front of the sheet, so that the user observes a single stereoscopic image. The sheet of lenticular elements thus provides a light output directing function.

In other arrangements, each lenticular element is associated with a group of, say, four or more adjacent display pixels in the row direction. Corresponding columns of display pixels in each group are arranged appropriately to provide a vertical slice from a respective two-dimensional sub-image. As a user's head is moved from left to right a series of successive, different, stereoscopic views are perceived creating, for example, a look-around impression.

The above-described device provides an effective three-dimensional display. However, it will be appreciated that, in order to provide stereoscopic views, there is a necessary sacrifice in the horizontal resolution of the device. This sacrifice in resolution is unacceptable for certain applications, such as the display of small text characters for viewing from short distances or graphics applications needing a high resolution. For this reason, it has been proposed to provide an autostereoscopic display device that is switchable between a two-dimensional (2D) mode and a three-dimensional (3D stereoscopic) mode. Such a device is described in U.S. Pat. No. 6,069,650, the entirety of which is incorporated herein by reference. In this device, different groups of pixels, forming one or more stereoscopic pairs, are seen by respective eyes of a viewer through the lenticular elements. The lenticular elements include electro-optic material having a refractive index that is switchable in order to enable removal of the refracting effect of the lenticular elements.

In the two-dimensional mode, the lenticular elements of the switchable device operate in a "pass through" mode, i.e. they act in much the same way as would a flat sheet of optically transparent material. The resulting display has a high resolution, equal to the native resolution of the display panel, which is suitable for the display of small text characters from short viewing distances. The two-dimensional display mode cannot, of course, provide a stereoscopic image.

In the three-dimensional mode, the lenticular elements of the switchable device provide a light output directing function, as described above. The resulting display is capable of providing stereoscopic images, but also suffers the inevitable resolution loss mentioned above.

In order to provide switchable display modes, the lenticular elements of the switchable device use an electro-optic material, such as a liquid crystal material, having a refractive index that is switchable between two different values for polarized light. The device is then switched between the modes by applying an appropriate electrical potential to electrode layers provided above and below the lenticular elements. The electrical potential alters the refractive index of the lenticular elements in relation to that of an adjacent optically transparent layer. Alternatively, the adjacent optically transparent layer may be formed of the electro-optic material, with the same result that the refractive index of the lenticular elements in relation to the optically transparent layer is altered.

Problems have been experienced, however, with unwanted display artefacts in the 2D mode when viewed at oblique angles. At such angles, a visible structure is present in the display output that appears to be related to the structure of the lenticular sheet, while no such structure is visible when viewing orthogonal to the plane of the display panel and the lenticular array.

SUMMARY OF THE INVENTION

According to one aspect of the present invention there is provided a switchable autostereoscopic display device comprising a display panel, and lenticular means arranged over the display panel, the lenticular means comprising an array of lenticular elements which comprise electro-optic material adjacent an optically transparent layer, the refractive index of the electro-optic material being switchable by the selective application of an electric field, and wherein the optically transparent layer comprises a birefringent material.

As before, the refractive index of the electro-optic material is switchable to provide the lenticular means with two states: one in which, for example, the light output directing action is provided, and one in which, for example, the light output directing action is removed. These are 2D and 3D modes of operation.

By forming the optically transparent layer of the lenticular means from birefringent material considerable improvement in the reduction of the aforementioned unwanted display artefacts in 2D mode displays at oblique angles can be achieved.

Preferably, the optically transparent layer has substantially the same ordinary, and maybe extra-ordinary, index of refraction as the electro-optic material.

The optically transparent layer preferably comprises a lens body in the form of a sheet or plate in which the array lenticular elements is formed. Each lenticular element may be defined by a recess in the body having a lens shape, for example a semi-cylindrical recess, containing the electro-optic material.

It is believed that the unwanted display artefacts are due to the fact that in the known device the refractive index of the optically transparent layer for light rays traveling generally perpendicularly to the plane of layer is different to the refractive index for light rays traveling at an oblique angle, for example, 45 degrees, with respect to the plane of the layer. In the 2D display mode, and with the molecules of the liquid crystal (LC) material oriented perpendicularly to the plane of the layer through suitable application of a voltage there across, then for light rays perpendicular to the layer the index of refraction of the LC material and the layer is matched, by appropriate selection of respective materials. However, for oblique light rays the effective index of refraction of the LC material is not equal to the ordinary index of refraction (typically around 1.5) but lies between the ordinary and extra-ordinary index of refraction (typically around 1.7). Consequently, the rays will be refracted at the curved lens surface between the LC material and the layer. This is thought to give rise to the display artefact structure visible to a viewer at an oblique angle to the display device. The nature of the display artefact structure appears to be related to the physical structure of the lenticular means. These effects are removed, at least to some extent, by improving the index matching between the LC material and the layer material through the provision of birefringent material for that layer.

The optically transparent layer preferably comprises a mixture of an LC material and a curable polymer, for example a UV curable polymer.

The optically transparent layer preferably has an effective refractive index of between 1.50 and 1.55 (and more preferably between 1.52 and 1.54) in a direction normal to the surface of the display panel. This matches the refractive index of the LC material in the same direction in the 2D mode. The optically transparent layer preferably has an effective refractive index of between 1.55 and 1.70 in a direction offset by 45 degrees laterally from the normal the surface of the display panel. Thus, the refractive index is greater for oblique light, to match the birefringence in the LC layer in the 2D mode.

The optically transparent layer thus preferably comprises a birefringent material having birefringence between a first direction normal to a surface of the display panel, and a second lateral direction offset laterally from the normal direction.

The electro-optic material is preferably switchable to define 2D and 3D modes of operation of the display device. The optically transparent layer has substantially the same ordinary and extra-ordinary refractive index as the electro-optic material when in the 2D mode of operation.

The invention also provides a method of controlling a switchable autostereoscopic display device, the device comprising a display panel, and lenticular means arranged over the display panel, the method comprising:

in a 3D mode, switching the refractive index of an electrically switchable optical material of lenticular elements by application of an electric field, thereby to define a refractive index change at a lens shaped boundary between the electrically switchable optical material and an optically transparent layer; and in a 2D mode, switching the refractive index of the electrically switchable optical material, thereby to define substantially no refractive index change at the lens shaped boundary, the optically transparent layer comprising a birefringent material, such that there is substantially no refractive index change for all directions across the lens shaped boundary.

Further features and advantages of the present invention will become apparent from reading of the following description of preferred embodiments of the present invention, given by way of example only, and with reference to the accompanying drawings, in which:

DETAILED DESCRIPTION OF THE EMBODIMENTS

Switchable display devices having a viewable display area which may be switched between a two-dimensional display mode and a three-dimensional display mode are known. Switching between modes is achieved by applying an electric field across an array of lens elements formed from an electro-optic material, such as LC material. In the two-dimensional mode, the lens elements behave as if they were an ordinary sheet of transparent material. In the three-dimensional mode, the lens elements provide a light output directing function so as to enable a stereoscopic image to be perceived.

Figure 1:
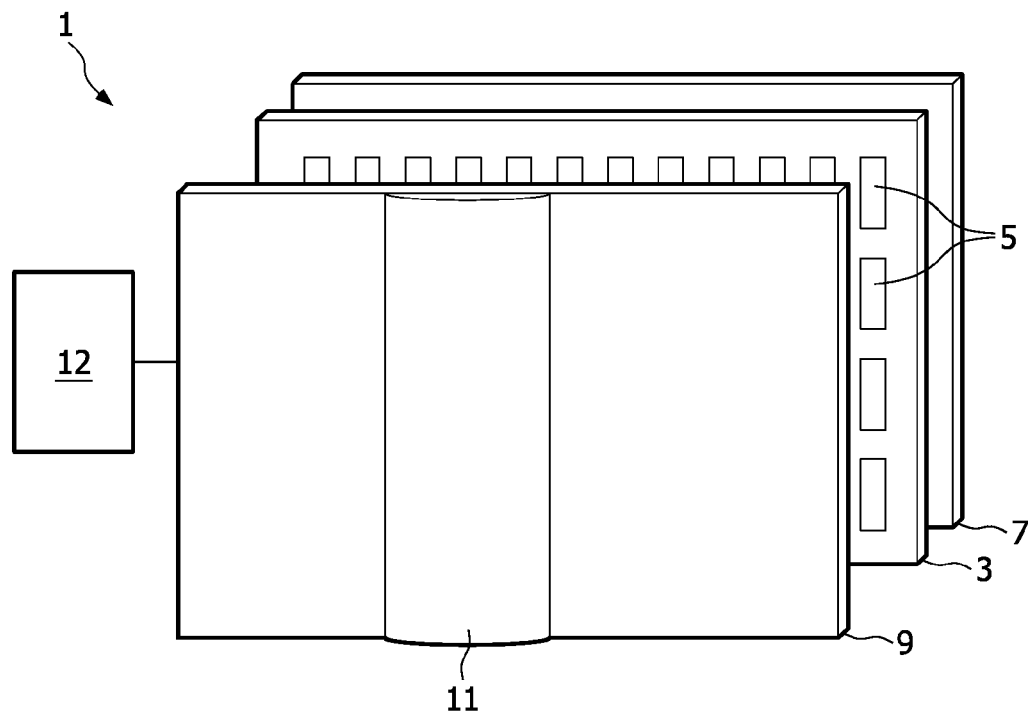
FIG. 1 is a schematic perspective view of a known autostereoscopic display device to which the invention can be applied.

FIG. 1 is a schematic perspective view of a known switchable autostereoscopic display device 1, and to which the present invention can be applied. The display device 1 is shown in expanded form.

The known device 1 comprises a liquid crystal display panel 3 of the active matrix type that acts as a spatial light modulator to produce the display. The display panel 3 has an orthogonal array of display pixels 5 arranged in rows and columns. For the sake of clarity, only a small number of display pixels 5 are shown in the Figure. In practice, the display panel 3 might comprise about one thousand rows and several thousand columns of display pixels 5.

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each display pixel 5 comprises opposing electrodes on the substrates, with the intervening liquid crystal material there between. The shape and layout of the display pixels 5 are determined by the shape and layout of the electrodes. The display pixels 5 are regularly spaced from one another by gaps.

Each display pixel 5 is associated with a switching element, such as a thin film transistor (TFT) or thin film diode (TFD). The display pixels are operated to produce a display by providing addressing signals to the switching elements, and suitable addressing schemes will be known to those skilled in the art.

The gaps between the display pixels 5 are covered by an opaque black mask. The mask is provided in the form of a grid of light absorbing material. The mask covers the switching elements and defines the individual display pixel areas.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises lenticular means comprising a lenticular element arrangement 9 positioned over the display output side of the display panel 3, which arrangement is controllable to selectively perform a view forming function. The lenticular element arrangement 9 comprises an array of lenticular elements 11 extending parallel to one another, of which only one is shown with exaggerated dimensions for the sake of clarity.

Figure 2:
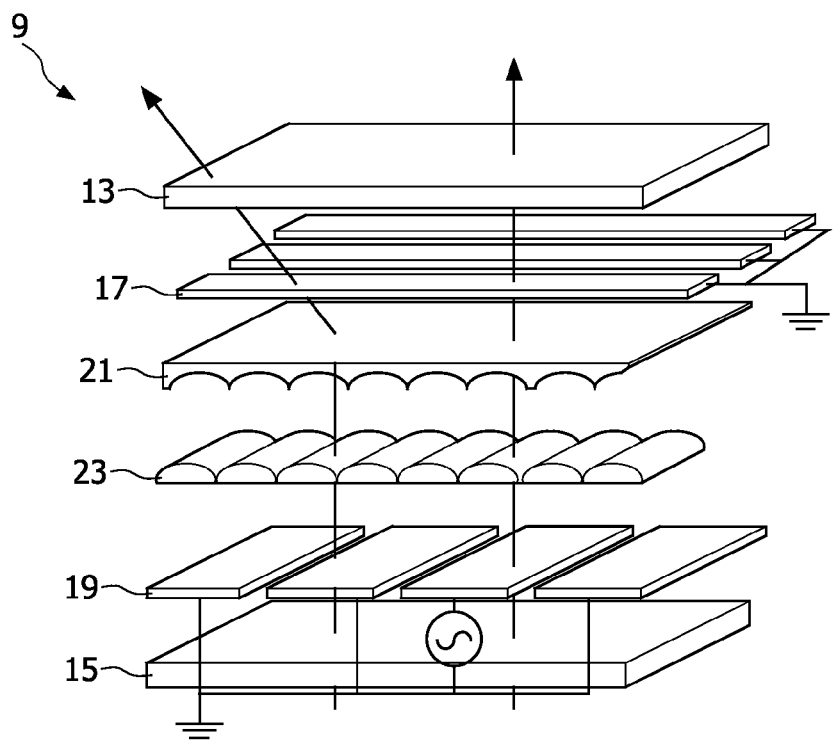
FIG. 2 is a detailed schematic view of an element of the known display device shown in FIG. 1.

The lenticular element arrangement 9 is shown schematically in more detail in FIG. 2. The arrangement 9 is shown in expanded form.

Referring to FIG. 2, it can be seen that the lenticular element arrangement 9 comprises a pair of transparent glass substrates 13, 15, with transparent electrode layers 17, 19 formed of indium tin oxide (ITO) provided on their facing surfaces. Each electrode layer 17, 19 is in the form of a plurality of parallel elongate electrodes, and electrodes of the respective different layers 17, 19 are arranged perpendicular to one another. The elongate electrodes are arranged with small gaps there between to enable them to be separately addressed.

An optically transparent layer 21 constituting a lenticular body and in the form of a sheet, or plate, having an inverse lenticular structure, is provided between the substrates 13, 15, adjacent to an upper one of the substrates 13. The lenticular body 21 is fabricated from plastics material using a replication technique. Nematic liquid crystal material 23 is also provided between the substrates 13, 15, adjacent to the lower one of the substrates 15. The inverse lenticular structure of the lenticular body 21 causes the liquid crystal material 23 to assume parallel, elongate semi-cylindrical lenticular shapes, between the lenticular body 21 and the lower substrate 15, as shown in the Figure. Surfaces of the inverse lenticular structure of the body 21 and the lower substrate 15 that are in contact with the liquid crystal material 23 are also provided with an orientation layer, 25 and 26, for orientating the liquid crystal material 23.

In use, the known switchable display device 1 shown in FIG. 1 is operable to provide a display output, discrete portions of which can be switched either alone, or in combination, between two-dimensional (2D) and three-dimensional (3d) display modes. In this way, one or more two-dimensional display windows can be provided in a three-dimensional display area.

Switchability of discrete portions of the display output between the modes is achieved by applying an electric field across the lenticular elements formed of liquid crystal material 23. This electric field is generated by applying an electrical potential across electrodes of the electrode layers 17, 19.

The electrical potential is applied to a selected number of adjacent ones of the elongate electrodes in each electrode layer 17, 19. The selection of the upper electrodes defines a height of a display window that is to be switched, and the selection of the lower electrodes defines a width of the display window to be switched.

Instead of being subdivided as shown, the electrodes 17 and 19 may each be single electrodes extending continuously over the pixel array and operable by the application thereto of suitable voltages simply to switch the display output in its entirety between 2D and 3D display modes.

The applied electrical potential causes the lenticular elements in the selected portion of the display area to switch between maintaining and removing a light output directing function, which will now be explained with reference to FIGS. 3A and 3B. Because of its static dielectric anisotropy, the orientation of the LC material can be controlled through an applied electric field. In the optical regime, there is also dielectric anisotropy and the index of refraction of the LC material is related to the relative dielectric constant. The LC material has an ordinary and an extra-ordinary index of refraction, the former being applicable for light with electric field polarization perpendicular to the director and the latter being applicable for light with electric field polarization parallel to the director.

Figure 3A:
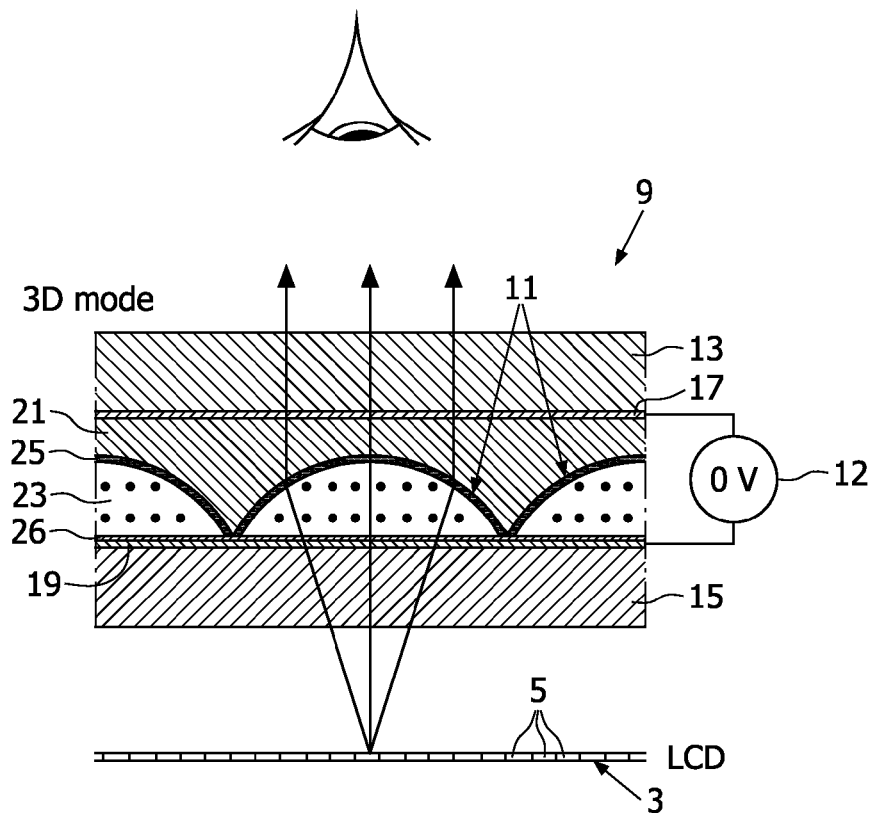
FIGS. 3A and 3B are used to explain the operating principle of the known display device shown in FIG. 1.

FIG. 3A is a schematic cross-sectional view of a portion of the lenticular element arrangement 9 when no electric potential is applied to the electrodes. Here, the rubbing directions of the orientation layers 25 and 26 and the polarization of the display light are in the z-direction. As a result, the effective lens, although being optically birefringent, can be approximated as an isotropic lens with an index of refraction corresponding to the extra-ordinary index of refraction of the LC material. In this state, the refractive index of the liquid crystal material 23 for linearly polarized light provided by the display panel is substantially higher than that of the body 21, and the lenticular shapes therefore provide the light output directing function, as illustrated.

Figure 3B:
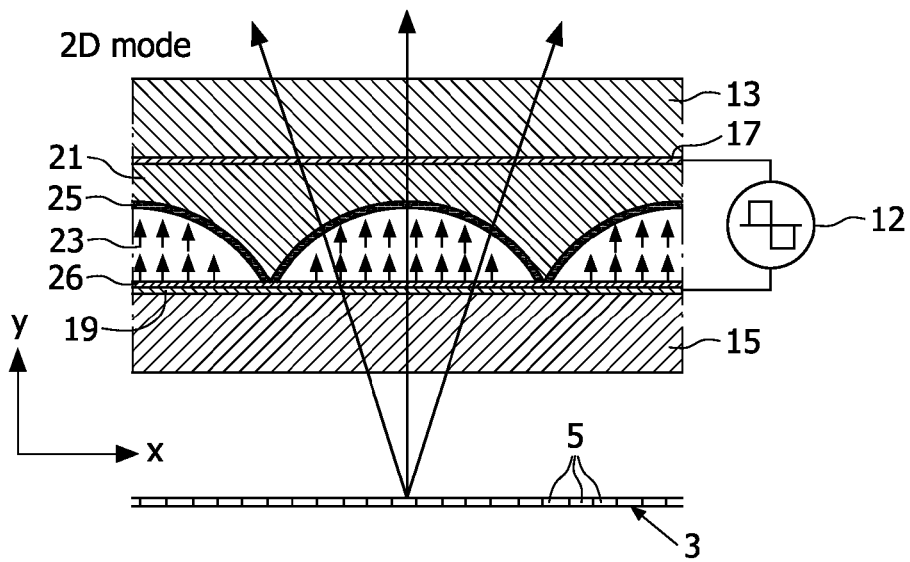

FIG. 3B is a schematic cross-sectional view of a portion of the lenticular element arrangement 9 when an alternating electric potential of approximately 50 volts is applied to the electrodes. An electric field is created in the y-direction and the LC molecules align with the field lines. As a result, the director is in the y-direction. The polarization direction of light from the display panel is linearly polarized. If the polarization of the display is in the z-direction, the effective lens will have the ordinary index of refraction, and light will not be refracted since there is an index match between the LC material and the lenticular body 21. In this state, therefore, the refractive index of the LC material 23 for light of the linear polarization provided by the display panel is substantially the same as that of the inverse lenticular structure of the body 21, so that the light output directing function of the lenticular shapes is cancelled, as illustrated. Thus, the array effectively acts in a "pass through" mode.

With the light output directing function maintained, as shown in FIG. 3A, the lenticular elements defined by the LC material 23 act as convex cylindrical lenses, and provide different images, or views, from the display panel 3 to the eyes of a user positioned in front of the display device 1. Thus, a three-dimensional image can be provided.

With the light output directing function removed, as shown in FIG. 3B, the lenticular elements defined by the liquid crystal material 23 act as if they were a flat sheet of as convex cylindrical lenses. Thus, a high-resolution two-dimensional image can be provided employing the full native resolution of the display panel 3.

The control of electrical potentials to switch between display modes is provided to the electrodes of the lenticular element arrangement 9 by a controller 12.

Further details of the structure of a known switchable autostereoscopic display device can be found in U.S. Pat. No. 6,069,650, to which reference is invited.

It has been found that undesirable display artefacts are visible in the display output of this device when viewing the display in 2D mode at an oblique angle, for example at around 45 degrees with respect to the plane of the display panel. These artefacts are in the form of visible dark banding or shading lines whose structure appears to be related to that of the lenticular array. When viewing a 2D mode display output orthogonal to the display panel the artefact structure is not present. It is believed that the artefacts are due to some residual lens effect.

Figure 4:
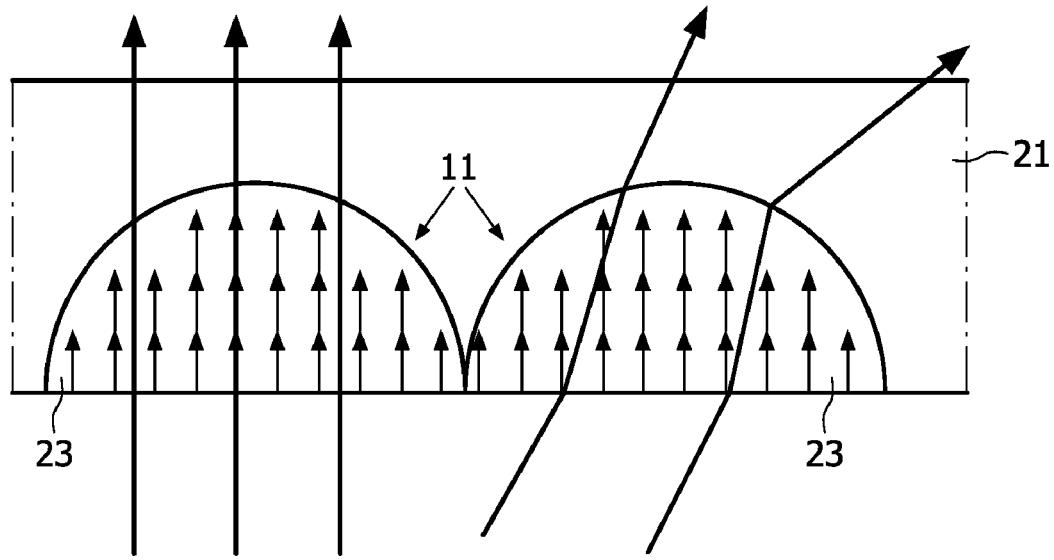
FIG. 4 is a schematic cross sectional view of two typical lenticular elements in the device of FIG. 1 depicting optical effects in operation.

The visibility of the structure may be explained as follows. In the 2D mode, a voltage is applied across the lenticular elements and the molecules of the LC material are oriented vertically, that is, approximately orthogonal to the plane of the display panel 3. FIG. 4 illustrates schematically the applied effect of two representative lenticular elements in the array in this mode and shows the vertical orientation of the LC material in these elements. Light rays traveling substantially perpendicularly to the display panel and the lenticular array do not see a change of index of refraction at the lens surface (the semi-cylindrical boundary between the LC material 23 and the lenticular body 21) as the index of refraction of the LC material and the lenticular body 21 is matched, and consequently the path of the light is unaltered. This is depicted for the left side lenticular element in FIG. 4.

For oblique light rays, however, the effective index of refraction of the LC material 23 is not equal to the ordinary index of refraction (typically around 1.5) but will have a value between the ordinary and extra-ordinary index of refraction (typically around 1.7). Consequently, the rays will be refracted at the curved lens surface, as depicted for the right side lenticular element in FIG. 4. Thus, due to the birefringent properties of the LC material, there is a residual lens effect when viewing the display at an oblique angle. It appears the focal length of the lenticular element is angular dependent. At normal angles, perpendicular to the display panel, the focal power is zero, whereas it increases for larger viewing angles. For a certain viewing angle, the focal point of the lenticular element is at the pixel structure of the display panel. As a result, the black matrix surrounding the pixels in the panel is imaged at infinity, and this is believed to be the cause of the visible artefact structure.

To overcome this problem, a birefringent material is used for the lenticular body 21. Preferably the birefringent material has the same ordinary and extra-ordinary index of refraction as the LC material.

Figure 5:
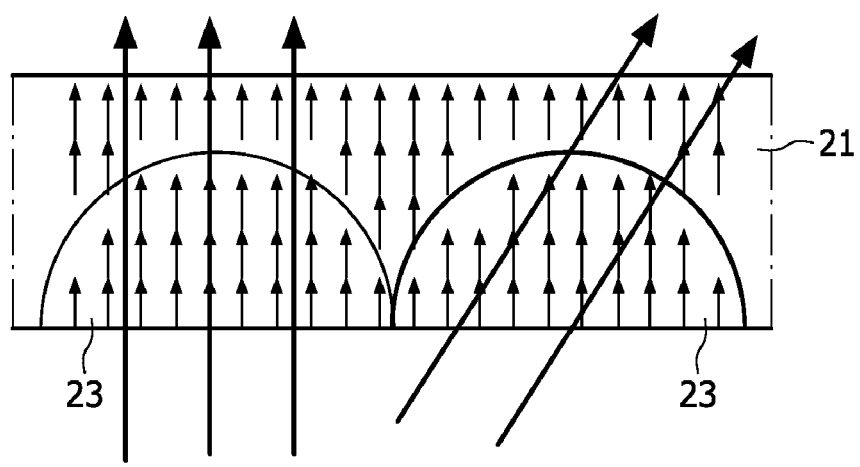
FIG. 5 is a view similar to that of FIG. 4 of part of the lenticular array in embodiment of display device according to the present invention.

The effect of this is illustrated in FIG. 5 which is a cross-sectional view of a part of the lenticular array 9 comprising two typical lenticular elements 11, and similar to that of FIG. 4. The orientation of the optical axis in the lenticular body 21 is preferably in the vertical direction, as shown in FIG. 5.

In the 3D mode of operation light from the display panel is polarized such that refraction is obtained at the lens surface. The light rays see the extra-ordinary index of refraction in the LC material 23 and the ordinary index of refraction in the lenticular body 21. Consequently, light rays in the vertical direction do not see a change of index of refraction at the lens surface and are not refracted.

In the 2D mode of operation, as depicted in FIG. 5, a voltage is applied across the lenticular elements and the LC material molecules are again oriented vertically. In this mode, the ordinary and extra-ordinary index of refraction of the LC material and the material of the lenticular body 21 match and there is no refraction at the lens surface. The lenticular element 11 to the left in FIG. 5 depicts the effects for light traveling vertically while the lenticular element 11 to the right depicts the effects for light traveling obliquely. As can be seen, in both cases the light rays do not see a change of index of refraction at the lens surface and are not refracted.

In particular, the optically transparent layer comprises a birefringent material having birefringence between a first direction normal to a surface of the display panel (i.e. vertical in FIG. 5 as shown in the left figure), and a second lateral direction (i.e. with a lateral component as shown in the right figure).

In greater detail, the LC material 23 inside the lenticular element 11 can be approximated by a homogeneous uniaxially anisotropic medium. The propagation of light in uniaxially anisotropic media can be described by two independent modes of polarization. The index of refraction of each independent mode depends on the direction of polarization and the direction of propagation with respect to the optical axis of the birefringent medium. The ordinary (O) wave, with ordinary index of refraction, has a direction of polarization perpendicular to the optical axis and a wave vector $k_o$. The extra-ordinary (E) wave has a polarization direction perpendicular to the polarization direction of the O wave. The extra-ordinary index of refraction of the E wave is dependent on the angle, $\partial$, between the wave vector $k_e$ and the optical axis.

It is possible to discriminate between the propagation of the O wave and the propagation of the E wave. For the O wave, the index of refraction does not depend on the direction of propagation. However, for the E wave, there is a variation in index of refraction, depending on the direction of propagation with respect to the optical axis. In other words, the index of refraction depends on the viewing angle as well. If the angle $\partial$ increases, the effective index of refraction increases as well. For a certain viewing angle, the refractive power of the lenticular has reached a value where the focal point of the switchable lenticular is exactly at the pixel structure of the display panel.

In the device of FIG. 5, the lenticular body 21 is optically birefringent with the optical axis in the vertical, y-direction. The LC material 23 used for the switchable lenticular elements for example has an ordinary index of refraction of 1.527 and extra-ordinary index of refraction 1.766. By changing the refractive indices of the birefringent lenticular body 21, the refractive power of the lenticular element is changed. In order to create a perfect index match for the O wave, then the ordinary refractive index of the lenticular body 21 is selected to be substantially equal to the ordinary refractive index of the LC material 23. As a result, there is no lens effect for the O wave.

The performance of the device in 3D mode is not significantly affected.

The birefringent lenticular body may comprise a mixture of a curable photopolymer, such as 2P, and LC material. The mixture is polymerized, for instance by UV curing.

In a less preferred embodiment, the extra-ordinary index of refraction of the material of the lenticular body 21 may not match with the extra-ordinary index of refraction of the LC material 23. Although in this embodiment there may still be some refraction at the lens surface, it will be significantly less than in the known device.

Various modifications and variations are possible, as will be appreciated by persons skilled in the art.

The invention claimed is:

1. A switchable autostereoscopic display device comprising a display panel, and a lenticular element arrangement arranged over the display panel, the lenticular element arrangement comprising an array of lenticular elements which comprise electro-optic material adjacent to an optically transparent layer, and electrodes for applying electric fields to the electro-optic material, the refractive index of the electro-optic material being switchable by the selective application of an electric field to define 2D and 3D modes of operation of the display device, wherein the optically transparent layer comprises a birefringent material, and wherein the optically transparent layer has substantially the same ordinary and extra-ordinary refractive index as the electro-optic material when in the 2D mode of operation.

2. A device according to claim 1, wherein the electro-optic material comprises liquid crystal material.

3. A device according to claim 1, wherein the display panel comprises a liquid crystal display panel.

4. A device according to claim 1, wherein the optically transparent layer comprises a mixture of an LC material and a curable polymer.

5. A device as claimed in claim 4, wherein the curable polymer is UV curable.

6. A device as claimed in claim 1, wherein the optically transparent layer has an effective refractive index of between 1.50 and 1.55 in a direction normal to the surface of the display panel.

7. A device as claimed in claim 1, wherein the optically transparent layer has an effective refractive index of between 1.55 and 1.70 in a direction offset by 45 degrees laterally from the normal the surface of the display panel.

8. A device as claimed in claim 1, wherein the optically transparent layer comprises a birefringent material having birefringence between a first direction normal to a surface of the display panel, and a second lateral direction offset laterally from the normal direction.

9. A method of controlling a switchable autostereoscopic display device, the device comprising a display panel, and a lenticular element arrangement arranged over the display panel, the lenticular element arrangement comprising an array of lenticular elements which comprise an electrically switchable optical material adjacent to an optically transparent layer, and electrodes for applying electric fields to the electrically switchable optical material, the method comprising:

in a 3D mode, switching the refractive index of the electrically switchable optical material of the lenticular elements by an application of an electric field to the electrodes to define a refractive index change at a lens shaped boundary between the electrically switchable optical material and the optically transparent layer; and in a 2D mode, switching the refractive index of the electrically switchable optical material to define substantially no refractive index change at the lens shaped boundary, the optically transparent layer comprising a birefringent material, such that there is substantially no refractive index change for all directions across the lens shaped boundary, wherein the optically transparent layer has substantially the same ordinary and extra-ordinary refractive index as the electro-optic material when in the 2D mode of operation.

10. A method according to claim 9, wherein the electrically switchable optical material comprises liquid crystal material.

11. A method as claimed in claim 9, wherein the optically transparent layer has an effective refractive index of between 1.50 and 1.55 in a direction normal to the surface of the display panel.

12. A method as claimed in claim 9, wherein the optically transparent layer has an effective refractive index of between 1.55 and 1.70 in a direction offset by 45 degrees laterally from the normal the surface of the display panel.

* * * * *